United States Patent [19]

Wipfelder et al.

[11] Patent Number: 5,262,456
[45] Date of Patent: Nov. 16, 1993

US005262456A

[54] FIRE RETARDANT CASTING RESIN MOLDING COMPOUNDS BASED ON EPOXY RESINS AND ACIDIC ESTERS OF HYDROXY-FUNCTIONAL PHOSPHORS

[75] Inventors: Ernst Wipfelder, Munich; Winfried Plundrich, Germering, both of Fed. Rep. of Germany

[73] Assignee: Siemens Aktiengellschaft, Munich

[21] Appl. No.: 972,081

[22] Filed: Nov. 5, 1992

Related U.S. Application Data

[63] Continuation of Ser. No. 561,071, Aug. 1, 1990, abandoned.

[30] Foreign Application Priority Data

Aug. 11, 1989 [DE] Fed. Rep. of Germany ....... 3926668

[51] Int. Cl.$^5$ .................... C08G 59/40; C08G 65/00
[52] U.S. Cl. ................................. 523/457; 523/427;
523/428; 523/429; 523/458; 525/523; 525/525;
525/526; 525/530; 525/531; 525/532; 525/533;
528/89; 528/94; 528/103; 528/108; 528/167;
528/168; 528/220; 528/228; 528/229; 528/287;
528/321; 528/337; 528/361; 528/365; 528/366;
528/398
[58] Field of Search ............... 523/427, 428, 429, 457,
523/458; 525/522, 525, 526, 530, 531, 532, 533;
528/89, 94, 103, 108, 167, 168, 220, 228, 229,
287, 321, 337, 365, 361, 366, 398, 399, 400

[56] References Cited

U.S. PATENT DOCUMENTS

| | | | |
|---|---|---|---|
| 2,627,521 | 2/1953 | Coover | 528/398 |
| 2,856,369 | 10/1958 | Smith et al. | 528/398 |
| 2,916,473 | 12/1959 | Ballock et al. | 528/108 |
| 3,364,159 | 1/1968 | Hecker et al. | 260/18 |
| 3,558,668 | 1/1971 | Hochreuter et al. | 528/398 |
| 3,661,857 | 5/1972 | Kerst | 528/398 |
| 4,048,141 | 9/1977 | Doorakian et al. | 526/266 |
| 4,380,571 | 4/1983 | Fretz, Jr. et al. | 428/415 |
| 4,632,973 | 12/1986 | Beck | 528/98 |

FOREIGN PATENT DOCUMENTS

| | | |
|---|---|---|
| 0327092 | 8/1989 | European Pat. Off. . |
| 2538675 | 3/1977 | Fed. Rep. of Germany . |
| 2652007 | 5/1978 | Fed. Rep. of Germany . |

*Primary Examiner*—Frederick F. Krass
*Attorney, Agent, or Firm*—Hill, Steadman & Simpson

[57] ABSTRACT

A halogen free casting resin suitable for covering electron devices with a fire retardant material contains an acidic ester of an hydroxy-functional phosphor compound and an organic anhydride. A stable mixture can be generated from the acidic ester and the hardener component of the casting resin, and further used for the hardening of epoxides resins. The acidic ester is chemically integrated in the epoxide resin matrix in a stable mixture, thereby improving the long term fire-retardancy of the casting resin molding compound without increasing the volatility of the mixture.

11 Claims, No Drawings

FIRE RETARDANT CASTING RESIN MOLDING COMPOUNDS BASED ON EPOXY RESINS AND ACIDIC ESTERS OF HYDROXY-FUNCTIONAL PHOSPHORS

This is a continuation of application Ser. No. 561,071, filed Aug. 1, 1990 now abandoned.

BACKGROUND OF THE INVENTION

The present invention relates to casting resins suitable for the production of fire retardant covers for electrical and electronic devices.

Casting resins can be used to protect active and passive components by covering, embedding, or sheathing the components with the casting resin. To protect the covered components, the hardened casting resin molding compounds should contain as few corrosion-stimulating components as possible. In particular, the casting resin should not contain ionic impurities.

Additionally, in order to reduce the risk of fire, casting resins should be fire retardant. Flammability is always a concern during the operation of electrical and electronic devices. The problem of producing fire retardant casting resin molding components has not been satisfactorily solved.

For example, known casting resins containing inorganic additives such as aluminum hydroxides, magnesium hydroxides, phosphates, borates, or red phosphors, have been used to reduce the risk of flammability. These additives, however, have undesirable effects on the thermal mechanical characteristics of the molding compounds during the resin processing. In particular, they cause an increase in the viscosity and sedimentation of the casting resins.

Other casting resin molding materials contain organic additives to achieve a fire retardant effect. The disadvantage of these additives, for example phosphorus-organic compounds, is that they display migratory characteristics when embedded in the resin matrix. While operating components covered with casting resin molding material containing organic additives, the migratory nature of the additives causes the characteristics of the casting resin molding compounds to fluctuate. The variation of the properties of the resin has an adverse effect on the operation of the components contained therein.

Halogenized, particularly bromized, resin components, to which antimony trioxide is frequently added to synergistically effect other components, provide a good flame retardant. But, in the case of fire, such fire retarding agents release toxic, environmentally contaminating substances. Further, it is preferred to limit the use of antimony trioxide, as it is a carcinogen.

SUMMARY OF THE INVENTION

The present invention provides low-corrosion casting resin molding compounds that do not include halogens and antimony trioxides, and are suitable for covering electrical and electronic devices. The casting resin molding compounds of the present invention have good processing qualities, particularly low viscosity. Additionally, the resins provide good mechanical, electrical, and chemical features. To this end, a casting resin molding compound based on an epoxide is provided, having a phosphor hardening component that reacts with epoxide resins.

In an embodiment, the hardener component includes an acidic ester of a hydroxy-functional first phosphor compound and an organic anhydride. In a further embodiment, the hydroxy-functional first phosphor compound includes a hydroxy alkyl phosphor compound.

In an embodiment, the phosphor compound includes at least two hydroxy groups.

In an embodiment, the phosphor compound is chosen from the group consisting of phosphine oxide, phosphonate, and phosphate.

In an embodiment, the phosphor compound has the following general structure:

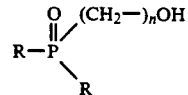

wherein:
R is an alkyl, aryl, or hydroxy alkyl group having one to ten carbon atoms; and
n is a whole number between one and six.

In an embodiment, the phosphor compound has the following structure:

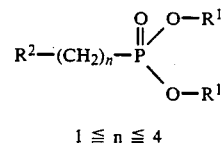

$1 \leq n \leq 4$ wherein
R1 is alkyl; and
R2 is either hydroxy alkyl or amino-hydroxyl alkyl.

In an embodiment, the resin includes an acidic ester derived from an aromatic, aliphatic, cycloaliphatic, or olefinic anhydride.

In an embodiment, the organic anhydride further includes an organic anhydride derived from either an aromatic di- or tetracarboxylic acid.

In an embodiment, the resin includes an additive within the epoxide resin. In a further embodiment, the additive further comprises triglycidyl phosphate. In a further embodiment, the additive further comprises diglycidyl phosphonate having the following general structure:

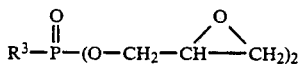

wherein R3 is alkyl-, amino alkyl- or aryl radical, e.g., Bis (2, 3-epoxy propyl) phenyl phosphonate.

In an embodiment, the resin includes a filler. In a further embodiment, the resin includes approximately 20% by weight aluminum hydroxide. In a further embodiment approximately 20% by weight of the casting resin is magnesium hydroxide.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides a low-corrosion resin compound that is free from halogens and antimony trioxides. To this end, the compound includes a phosphor compound which is not only a flame retardant, but also a constituent of the hardener component. The phosphorus compound is chemically bound in the resin matrix during the hardening process. The phosphorus compound does not effect the physical or chemical features of the casting resin molding compound. As a result of chemical binding of the phosphor compound, for example an acidic ester, within the polymer network, the phosphor-containing ester does not migrate, even when stresses due to temperature fluctuations are applied to the casting resin molding compound. Accordingly, the fire retardant behavior of the molding compound remains constant under variant conditions.

The epoxide casting resins of the present invention meet the necessary fire retardant requirements for applications involving electrical or electronic devices. The casting resin can be an acidic or an anhydride hardening/catalyzing compound. The acidic ester represents a constituent of the hardener component. By mixing an acidic ester with the casting resin a very storage-stable mixture is achieved.

The stable viscosities achieved by using the methods disclosed herein allow for the processing of casting resins for applications involving electrical and electronic devices to be achieved without difficulty. A further advantage of using phosphor-containing acidic esters is that it provides an accelerating effect on the poly-addition reaction epoxide-anhydride. Thus, additional accelerators are not required. Therefore, it is possible to realize favorable compromises between service life and hardening speed of the casting resins.

Further, the hardened casting resin molding material of the present invention provides many favorable qualities. Beyond chemical and physical stability, a molding compound manufactured from the casting resin of the present invention is distinguished by its increased flexibility. Compared to conventional casting resins, the inventive casting resin results in casting resin molding compounds having a broad profile of mechanical qualities. Thus, these materials are particularly suitable for covering mechanically sensitive parts, such as miniaturized electronic devices.

A further advantage of the invention is that the phosphor compound is converted into acidic esters with mono-or polyhydroxy alkyl groups with mono and/or dianhydrides. The phosphor compounds are readily available, and the acidic esters may be easily prepared.

In a preferred embodiment, an acidic ester, whose phosphor compound may consist of two hydroxy groups or two hydroxy alkyl groups, is used. Each phosphor compound can bind with two esters, wherefrom esters carrying at least two acid groups result. These acid groups enable the acidic ester to be bound within the polymer chain during the hardening reaction of the casting resin. This results in improved mechanical features of the casting resin molding compound.

In an embodiment, the casting resin molding compounds contain a phosphor compound, phosphine oxide, having the following structural formula (1):

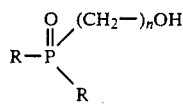

wherein:

R is alkyl, aryl or hydroxy alkyl with respectively one to ten carbon atoms; and n is a whole number between one and six.

Acidic esters of hydroxy phosphorous compounds are used in casting resins requiring particularly high fire retardancy.

In another embodiment of the present invention, the casting compound includes a phosphor having the structural formula (2):

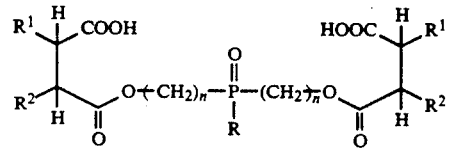

which represents an acidic ester which is obtained by reaction of a first phosphor compound having two hydroxy alkyl groups having the structural formula (1), with two monoanhydrides. In formula (2) above, R1 and R2 may also be organic radicals. R1 and R2 in the simplest case are hydrogen.

In general, the acidic ester is derived from phosphor compounds, that can consist of the group of phosphates, phosphonates and phosphine oxides.

Resins wherein the anhydride is derived from an aromatic di- or tetracarboxylic acid, also have important fire retardancy characteristics. The aromatic frame of the carbonic acid can be a mono- or polynuclear aromate. A simple structure of this group of compounds is phthalic acid anhydride, a solid anhydride. Such an embodiment results in an further advantage in that the solid anhydride is converted into a liquid state by transferring a hydroxy-functional phosphor compound into an acidic ester. This makes the use of anhydrides and hardener components for casting resins much easier; components that are liquid are readily mixable and have a low viscosity.

Further examples of aromatic anhydrides useful for the formation of acidic ester include: benzene-1,2,4,5-tetracarboxylic acid dianhydride; benzophenone tetracarboxylic acid dianhydride; perylene-3,4,9,10-tetracarboxylic acid-3,4,9,10-dianhydride; naphthalene-1,8-dicarboxylic acid anhydride; benzoic acid anhydride; and biphenyl tetracarboxylic acid dianhydride.

Not only aromatic, but also cycloaliphatic, and olefinic anhydrides can be used in the formation of acidic esters in the present invention. For example, hexahydrophthalic acid anhydride, methylhexahydrophthalic acid anhydride, succinic acid anhydride, valerian acid anhydride, isovalerian acid anhydride, hexane acid anhydride, pivalic acid anhydride, 5-norborne-2, 3-dicarbonic acid anhydride, maleic acid anhydride, 2-dodecene-1-yl, succinic acid anhydride, and methyltetrahydrophthalic acid anhydride can be used.

For casting resins which contain a first hydroxy phosphor compound acidic acid, amounts of up to 10% by weight of phosphor in the compound can be achieved. However, a preferred range of phosphor in the compound is from approximately 2.5 to about 5%. Thus, the hardener component can be entirely composed of acidic ester. Even if the fire retardance of a casting resin compound is not directly proportional to its phosphor content, as a general rule, a higher phosphor content produces a higher fire retardant casting resin molding compound. Pursuant to the present invention, a compound having higher fire retardant characteristics can be achieved in a casting resin molding compound containing phosphor components which react with the resin, that are of low-molecular weight and lower viscosity, it therefore has a positive influence on the processing qualities of the resin.

An example of such a reactive component is triglycidyl phosphate (TGP), a tri-functional epoxide with a low viscosity of approximately 100 mPas at room temperature. TGP contains 11.6% phosphor, and therefore, affords the ability to significantly increase the total phosphor content of the casting resin molding compound. Further, TGP can be bound well within the resin matrix. It was noted by the inventors that the essential determinant of the fire retardancy is the phosphor containing acidic ester. Thus, casting resin molding compounds containing only TGP as a fire retardant have in significantly lower fire retardant characteristics.

Another phosphor containing component that can react with the resin that has a lower molecular weight and lower viscosity, is diglycidylphosphonate, which has the structural formula (3),

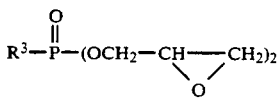

wherein $R^3$ is alkyl-, amino alkyl- or aryl radical, e.g., Bis (2,3-epoxy propyl) phenyl phosphonate.

A further option for introducing phosphor into the polymer network is the utilization of a phosphor containing anhydride, such as triphenylphosphoranylide succinic acid anhydride having the following structure (4):

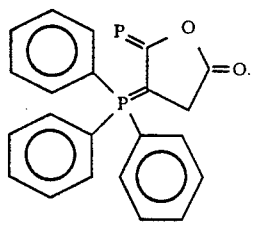

Other flame retarding additives such as aluminum hydroxide, magnesium hydroxide, and the like can be added to the reactive phosphor compounds.

In prior casting resin compounds, in order to achieve a sufficient fire retardancy up to 60% filler material was required. In the casting resin molding compound of the present invention only 20% filler material is required to achieve the same level of fire retardancy.

The phosphor containing acidic esters are obtained by a reaction of the hydroxy phosphor compound with the corresponding anhydrides at temperatures in the range of 90° to 120° C. This reaction can be observed by infrared spectroscopy, or by determination of the acid number. The reaction takes approximately two to about five hours. Acidic esters of the following phosphor organic compounds are generated: diethyl-N,N-bis-(2-hydroxy ethyl) aminomethyl phosphonate;sek.-butyl-bis-(2 hydroxy ethyl)-phosphine oxide) (BPO); and 2-hydroxy ethylphosphonic acid dimethyl ester.

Anhydrides converted by this method include: hexahydrophthalic acid anhydride (HHPSA); succinic acid anhydride (BSA); and phthalic acid anhydride (PSA).

Triglycidyl phosphate (TGP) starting products, which can serve as a base in the generation of TGP, are phosphoryl chloride and glycidol. These compounds react according to formula 1, set forth below, splitting off hydrochloric acid/hydrogen chloride to form the TGP.

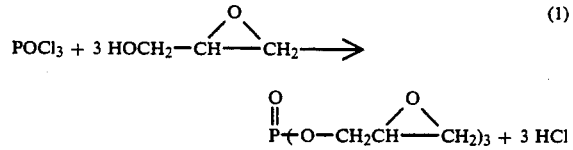

TGP is obtained in a high yield and pure form (chloride content less than 10 PBM) in a simple reaction.

By way of example, and not limitation, examples of the present invention will now be given:

EXAMPLE 1

An acidic ester was produced by esterification of phosphine oxide BPO with phthalic acid anhydride given a molar ratio 1:2. 89 parts of this ester were mixed with 100 parts of a bisphenol-A-diglycidyl ether (epoxide equivalent 0.52 mol/100 g), 23 parts of the anhydride HHPSA and 45 parts of a filling substance Apyral R given 80° C. The filler, Apyral R, is a registered trademark VAW (Vereinigte Luminium Verke), and is composed of aluminum hydroxide. The mixture was degassed and filled in a corresponding casting form, then hardened for two hours at 110° C., followed by a hardening two hours at 150° C.

Standardized test rods were produced with this casting resin and were subjected to the fire retardancy test according to Underwriters Laboratories UL94VO. The resultant casting resin molding compound met the UL94V0 requirements up to a specimen thickness of 1.6 mm.

The base compound specified herein may also be created using a variety of base compounds, from which a plurality of acidic esters can be generated, resulting in a fire retarding casting resin molding compound as herein disclosed. The chemical integration of these acidic esters into the resin matrix of a casting resin molding compound does not change the physical or chemical features of the molding compound.

Advantageous features of the casting resin molding material include its hydrolysis- resistance, low E corrosion, and variability in mechanical profile. Therefore, the casting resin molding material provides excellent sheathing, embedding, covering etc. of electron devices.

EXAMPLE 2

Succinic acid anhydride (BSA) and phosphine oxide (BPO) were converted to acidic ester at a molar ratio of 2:1 at 110° C. From the resulting ester, 45.8 parts were mixed with 53.5 parts of bisphenol-A-diglycidyl ether (epoxy value 0.052 Mol/100 g), 7.1 parts of the anhydride HHPSA and 18.8 parts of the filling material aluminum hydroxide at 80° C. After 5 minutes of mixing and degassing at 80° C., the resin formulation had a viscosity of 640 mPas and a service life of 25 minutes.

A corresponding casting form was filled and heated for two hours at 110° C. followed by two hours at 150°.

The resultant casting resin molding compound, constructed in accordance with the principles of the present invention, met the UL94VO fire retardancy requirements up to a specimen thickness of 1.6 mm.

EXAMPLE 3

After mixing at 80° C., followed by 5 minutes of stirring and degassing 21 parts of bisphenol-A-diglycidyl-ether (epoxy value 1.0 mol/100 g), 10.5 parts of the bisphenol-A-diglycidylether (epoxy value 0.52 mol/100 g), 0.3 parts of the accelerator 1-cyanoethyl-2 phenylimidazole, 21.1 parts of the filling material aluminum hydroxide, 52.6 parts of acidic ester manufactured by esterification of the phosphine oxide (BPO) with succinic acid anhydride at a ration of 1:2, the resulting substance was placed into a corresponding casting form. Test rods were manufactured after the material hardened for two hours at 110° C. followed by hardening for two hours at 150° C. The resulting test rod fulfilled the UL94VO fire retardance requirements up to a specimen thickness of 0.8 mm.

EXAMPLE 4

Esterification of phosphine oxide (BPO) with maleic anhydride, at a molar ratio of 1:2, produced an acidic ester at 90° C. 86.2 mass particles of this ester were then mixed with 100 parts of a low viscosity bisphenol-F-diglycidyl ether (epoxy value 0.615 mol/100 g), 26.6 parts of the anhydride HHPSA, and 53.2 parts of the filling substance aluminum hydride at 60° C. After five minutes of stirring and degassing the resulting casting resin had a viscosity of 1480 mPas at 60° C., with a service life of 28 minutes. The casting resin was filled into a casting form and hardened for two hours at 110° C. followed by two hours at 150° C.

Such samples not only have passed the E-corrosion check according to DIN 53489, but also had a low water acceptance value and good hydrolysis resistance values.

These casting resin molding compounds satisfied the UL94VO fire retardancy requirements up to a specimen thickness of 1.8 mm.

EXAMPLE 5

100 parts at 60° C. of a bisphenol-A-diglycidyl ether (epoxy value 1.0 Mol/100 g), 100 parts of a propane phosphonic acid diglycidyl ester (epoxy value 0.81 Mol/100 g), 129.8 mass particles of the filling substance aluminum hydroxide, 107.5 parts of the anhydride HHPSA, and 212 parts of the acidic ester previously described were mixed, followed by five minutes of stirring and degassing resulting in casting resins with a viscosity of 800 mPas at 60° C., with a service life of 22 minutes. After 37 minutes of 60° C., a viscosity of 3000 mPas was achieved. The resulting casting resin was hardened for two hours at 110° C.

Test rods developed from this composition fulfilled the UL94VO fire retardancy requirements for sample thickness of 0.2 mm.

EXAMPLE 6

A resin formulation described in Example 5 above showed more favorable processing features, as well as excellent fire retarding behavior, in the absence of the filling substance aluminum hydroxide.

An absence of aluminum hydroxide filler in the process described in Example 5 results in test rods fabricated from the casting resin molding compound described in Example 5, which pass the fire retardancy test UL94VO up to a sample thickness of 1.6 mm.

Evaluation of the Casting Resin Compound Formulations

The casting resin mixtures of Example 4 are particularly advantageous in that they can be readily processed. Further, the resulting chemical molding compound has chemical and mechanical features that pass the E-corrosion test according to DIN 53489, as well as low water acceptance, hydrolysis resistance, and good fire retardancy (halogen-free).

Better processing qualities can be achieved if, as in example 5, a very low viscosity phosphor containing epoxide is used simultaneously as a "liquifier" or "additional flame retardant".

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A casting resin based on an epoxide suitable for fabricating fire retardant covers for electron devices, said casting resin comprising:
an epoxy resin component and a hardener component consisting of triphenylphosphoranylide succinic acid anhydride and an acidic ester which is the reaction product of a hydroxy-functional phosphor compound and an organic anhydride, wherein the hydroxy-functional phosphor compound has the following general structure:

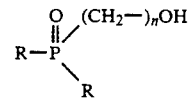

wherein:
R is an alkyl-, aryl-, or hydroxy alkyl group having one to ten carbon atoms;
n is a whole number between one and six; and wherein the organic anhydride is an anhydride of an aromatic di- or tetracarboxylic acid or a mixture thereof.

2. The casting resin of claim 1 wherein said phosphor compound has at least two hydroxy groups.

3. The casting resin of claim 1 further comprising triglycidyl phosphate.

4. The casting resin of claim 1 further including a filler.

5. The casting resin of claim 1 including aluminum hydroxide in an amount which constitutes 20% of the weight of the casting resin.

6. The casting resin of claim 1 including magnesium hydroxide in an amount constituting 20% of the weight of the casting resin.

7. A casting resin based on an epoxide suitable for fabricating fire retardant covers for electron devices, said casting resin comprising:
an epoxy resin component and a hardener component consisting of triphenylphosphoranylide succinic acid anhydride and an acidic ester which is the reaction product of a hydroxy-functional phosphor compound and an organic anhydride, wherein the hydroxy-functional phosphor compound has the following general structure:

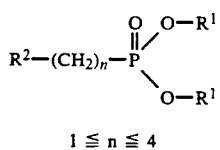

$1 \leq n \leq 4$ wherein:
$R^1$ is alkyl; and
$R^2$ is either hydroxy alkyl or amino-hydroxyl alkyl;
and wherein the organic anhydride is an anhydride of an aromatic di- or tetra- carboxylic acid or a mixture thereof.

8. The casting resin of claim 7 further comprising triglycidyl phosphate.

9. The casting resin of claim 7 further including a filler.

10. The casting resin of claim 7 including aluminum hydroxide in an amount which constitutes 20% of the weight of the casting resin.

11. The casting resin of claim 7 including magnesium hydroxide in an amount constituting 20% of the weight of the casting resin.

* * * * *